(12) United States Patent
Worthington et al.

(10) Patent No.: US 11,591,539 B2
(45) Date of Patent: Feb. 28, 2023

(54) LUBRICANT COMPOSITION AND USE OF THE SAME AS A PIPE DOPE

(71) Applicant: SHELL OIL COMPANY, Houston, TX (US)

(72) Inventors: Eduard Alexander Worthington, Hamburg (DE); Stefan Daegling, Hamburg (DE); Alan Richard Wheatley, London (GB); Dennis Ernens, Rotterdam (NL); Gerben Westra, Rotterdam (NL); Yves Louis Charly Arjen Schoen, Rotterdam (NL); Henry Rihard Pasaribu, Rotterdam (NL)

(73) Assignee: SHELL USA, INC., Houston, TX (US)

( * ) Notice: Subject to any disclaimer, the term of this patent is extended or adjusted under 35 U.S.C. 154(b) by 0 days.

(21) Appl. No.: 17/051,494

(22) PCT Filed: Apr. 24, 2019

(86) PCT No.: PCT/EP2019/060521
§ 371 (c)(1),
(2) Date: Oct. 29, 2020

(87) PCT Pub. No.: WO2019/206999
PCT Pub. Date: Oct. 31, 2019

(65) Prior Publication Data
US 2021/0363457 A1    Nov. 25, 2021

(30) Foreign Application Priority Data
Apr. 26, 2018    (EP) .................................... 18169503

(51) Int. Cl.
*C10M 169/00*    (2006.01)
*C10M 101/00*    (2006.01)
(Continued)

(52) U.S. Cl.
CPC ........ *C10M 169/00* (2013.01); *C10M 101/00* (2013.01); *C10M 103/02* (2013.01);
(Continued)

(58) Field of Classification Search
None
See application file for complete search history.

(56) References Cited

U.S. PATENT DOCUMENTS

| 4,116,866 A | 9/1978 | Finlayson |
| 5,154,840 A | 10/1992 | Drake et al. |

(Continued)

FOREIGN PATENT DOCUMENTS

| CN | 1197107 A | 10/1998 |
| CN | 102627997 A | 8/2012 |

(Continued)

OTHER PUBLICATIONS

International Search Report and Written Opinion received for PCT Patent Application No. PCT/EP2019/060521, dated Aug. 7, 2019, 11 pages.

(Continued)

*Primary Examiner* — Vishal V Vasisth
(74) *Attorney, Agent, or Firm* — Shell USA, Inc.

(57) ABSTRACT

The present invention provides a lubricant composition comprising: (i) a base oil (ii) an organophilic clay-based thickener; and (iii) a solid lubricant, wherein said solid lubricant does not comprise any heavy metals. The present invention also provides the use of a lubricant composition comprising: a base oil; an organophilic clay-based thickener; and a solid lubricant, wherein said solid lubricant does not comprise any heavy metals, as a pipe dope.

7 Claims, 3 Drawing Sheets

(51) Int. Cl.

| | | |
|---|---|---|
| *C10M 103/02* | (2006.01) | |
| *C10M 111/02* | (2006.01) | |
| *C10M 113/16* | (2006.01) | |
| *C10M 125/24* | (2006.01) | |
| *C10M 133/42* | (2006.01) | |
| *C10M 141/06* | (2006.01) | |
| *C10M 149/18* | (2006.01) | |
| *C10M 161/00* | (2006.01) | |
| *F16L 15/00* | (2006.01) | |
| *C10N 30/00* | (2006.01) | |
| *C10N 40/34* | (2006.01) | |

(52) U.S. Cl.
CPC ......... *C10M 111/02* (2013.01); *C10M 113/16* (2013.01); *C10M 125/24* (2013.01); *C10M 133/42* (2013.01); *C10M 141/06* (2013.01); *C10M 149/18* (2013.01); *C10M 161/00* (2013.01); *F16L 15/006* (2013.01); *C10M 2201/0413* (2013.01); *C10M 2201/085* (2013.01); *C10M 2201/145* (2013.01); *C10M 2203/1006* (2013.01); *C10M 2215/30* (2013.01); *C10M 2217/044* (2013.01); *C10N 2030/64* (2020.05); *C10N 2040/34* (2013.01)

(56) References Cited

U.S. PATENT DOCUMENTS

| | | | | |
|---|---|---|---|---|
| 2011/0160105 A1* | 6/2011 | Tanaka | ............. | C10M 129/40 |
| | | | | 508/144 |
| 2015/0045272 A1* | 2/2015 | Fujimaki | ............. | C10M 141/06 |
| | | | | 508/503 |
| 2015/0191674 A1 | 7/2015 | Goto et al. | | |

FOREIGN PATENT DOCUMENTS

| | | |
|---|---|---|
| CN | 103468353 B | 3/2015 |
| CN | 105586128 A | 5/2016 |
| CN | 106479652 A | 3/2017 |
| EP | 0668342 A1 | 8/1995 |
| EP | 0776959 A2 | 6/1997 |
| EP | 1029029 A1 | 8/2000 |
| EP | 2881454 A1 | 6/2015 |
| GB | 781525 A | 8/1957 |
| GB | 1599904 A | 10/1981 |
| RU | 2606388 C1 | 1/2017 |
| WO | 9721788 A1 | 6/1997 |
| WO | 9941332 A1 | 8/1999 |
| WO | 0008115 A1 | 2/2000 |
| WO | 0014179 A1 | 3/2000 |
| WO | 0014183 A1 | 3/2000 |
| WO | 0014187 A2 | 3/2000 |
| WO | 0014188 A2 | 3/2000 |
| WO | 0015736 A2 | 3/2000 |
| WO | 0118156 A1 | 3/2001 |
| WO | 0157166 A1 | 8/2001 |
| WO | 2010003918 A1 | 1/2010 |
| WO | 2017029287 A1 | 2/2017 |

OTHER PUBLICATIONS

Database WPI Week 201666, Oct. 12, 2016, XP002793174.
"Solid Lubricants", Jan. 1, 2000, XP055607504, retrieved from the Internet: URL:http://www.idc-online.com/technical_references/pdfs/chemical_engineering/Solid_lubricants.pdf, pp. 3.
Inose et al., "Influence of Grease on High-Pressure Gas Tightness by Metal-to-Metal Seals of Premium Threaded Connections", Tribology Online, vol. 11, Issue No. 2, Apr. 2016, pp. 227-234.
Nowinka et al., "New Standard for Evaluating Casing Connections for Thermal Well Applications", SPE Drilling & Completion, vol. 26, Issue No. 3, Sep. 2011, pp. 419-431.
"Engine Oil Licensing and Certification System", API Publication 1509, 15th Edition, Appendix E, Apr. 2002, pp. 84.
Office Action Received for EP Application No. 19719294.1, dated Dec. 17, 2021, 05 pages of English Translation.
Office Action Received for Chinese Application No. 201980027413.X, dated Feb. 25, 2022, 17 Pages (9 Pages of English Translation and 8 Pages of Official Copy).
Office Action Received for Russian Application No. 2020138608, dated Oct. 6, 2022, 13 Pages(4 Pages of English Translation and 9 Pages of Official Copy).

* cited by examiner

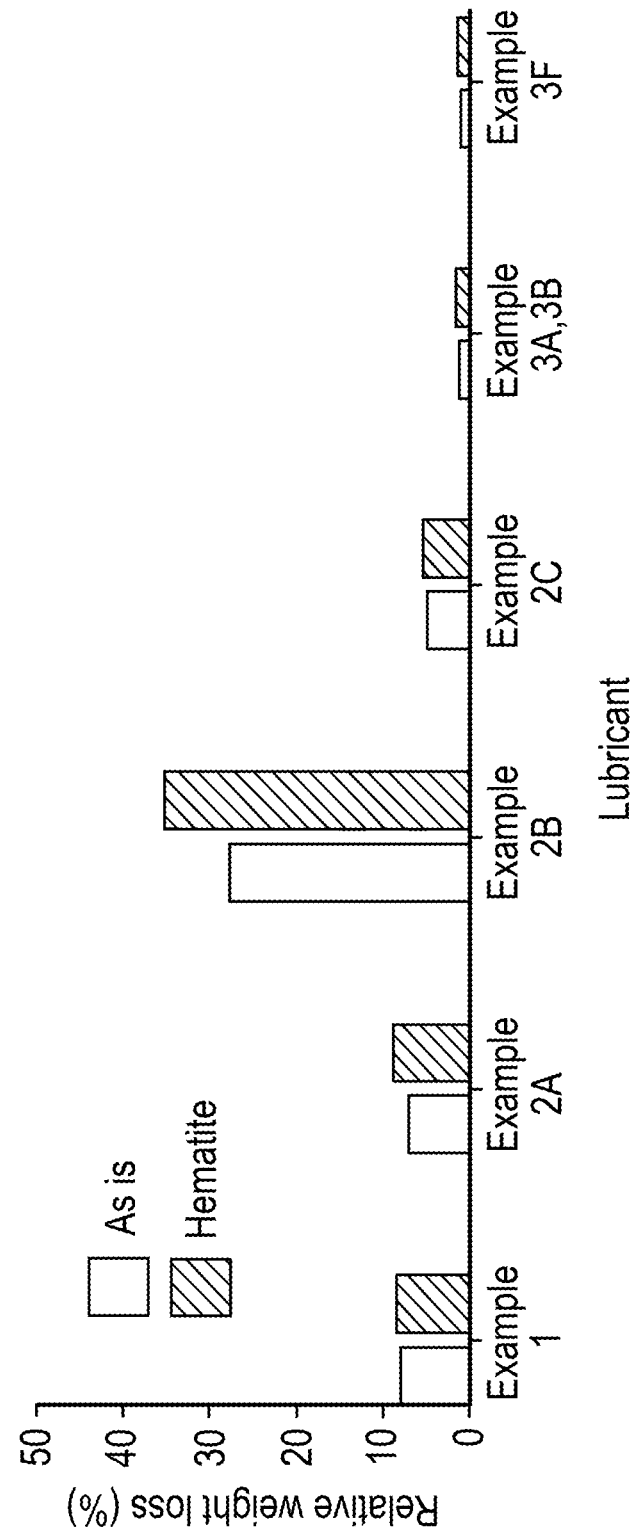

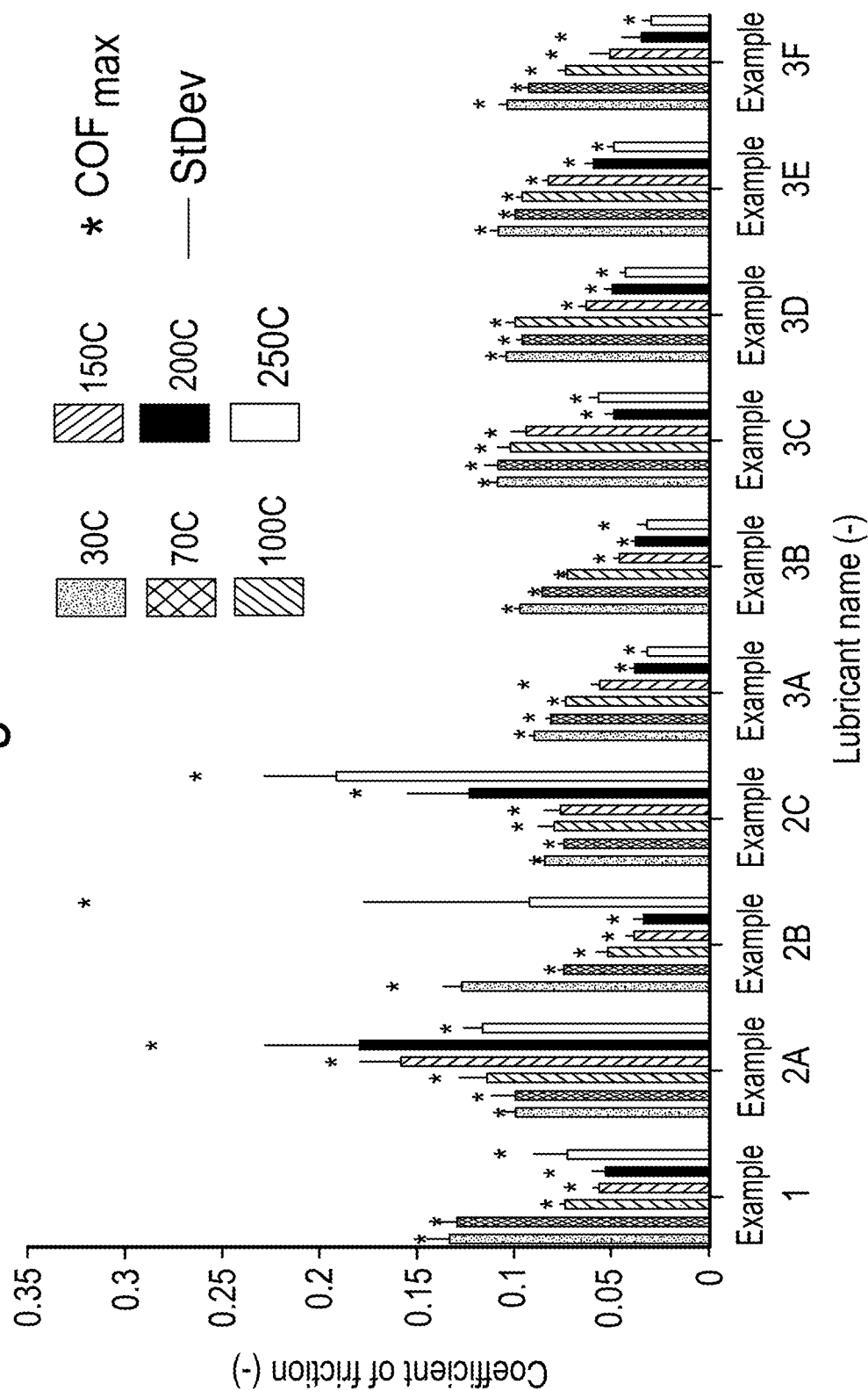

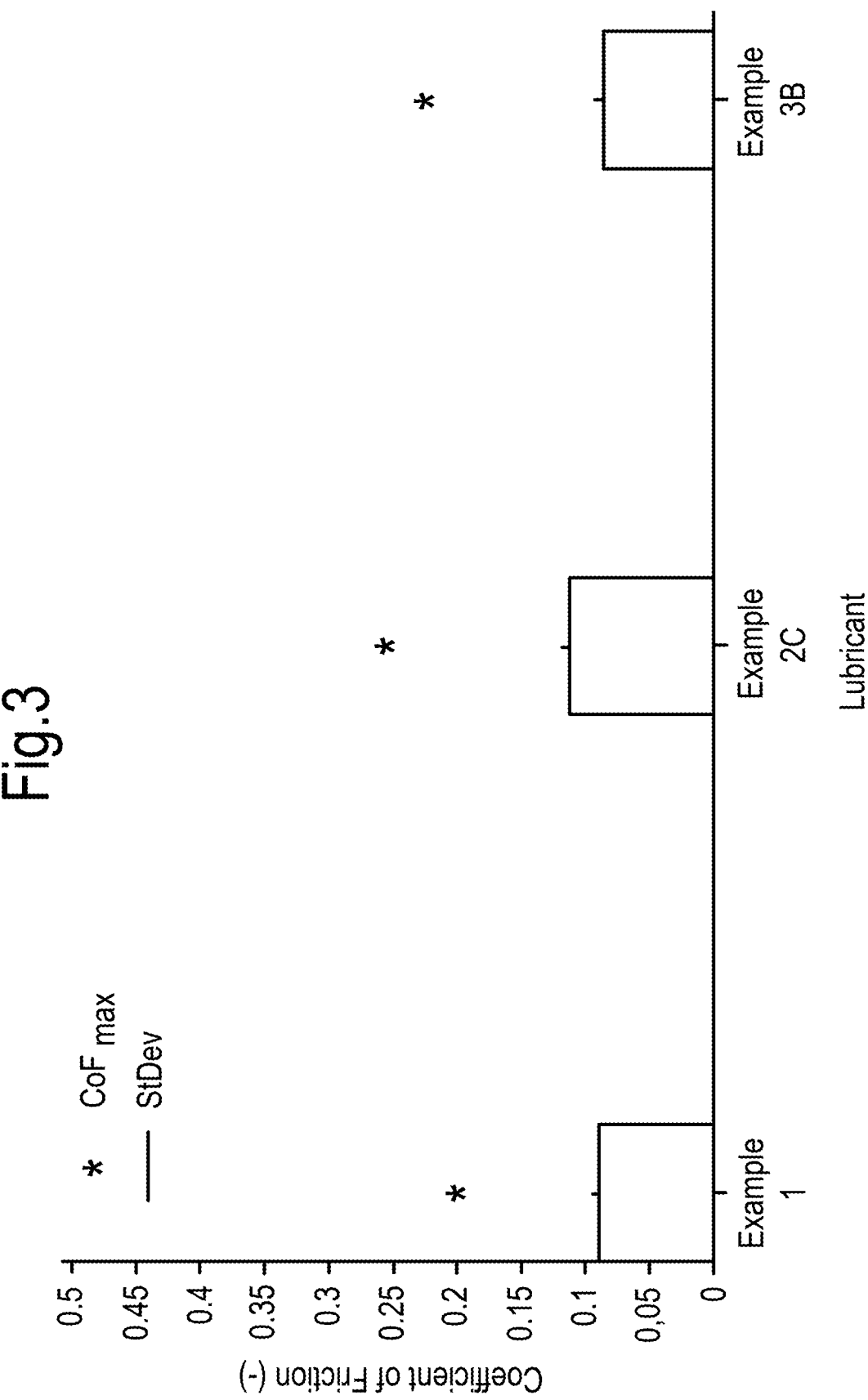

LUBRICANT COMPOSITION AND USE OF THE SAME AS A PIPE DOPE

CROSS REFERENCE TO RELATED APPLICATIONS

This is a national stage application of International Application No. PCT/EP2019/060521, filed 24 Apr. 2019, which claims benefit of priority to European Patent Application No. 18169503.2, filed 26 Apr. 2018.

FIELD OF THE INVENTION

The present invention relates to a lubricant composition and use of the lubricant composition as a pipe dope. The present invention also relates to a high-pressure pipe thread joint comprising the lubricant composition.

BACKGROUND OF THE INVENTION

Pipe dope is a term used to describe a lubricant composition (sometimes the term "grease composition" is used) used to make a pipe joint leak proof and pressure tight. The pipe dope fulfils an important role in a casing connection system. In the assembly phase, it needs to lubricate and protect against excessive wear under ambient conditions. After installation in a well it needs to protect the sealing surfaces from small sliding movements because of loading and unloading or thermal effects at operating conditions. Further the pipe dope aids in plugging channels present in a metal seal improving seal ability of a casing connection. As well as helping to seal pipe joints, the pipe dope also acts as a lubricant to help prevent seizing of the parts of the pipe to be joined and allowing easy disassembly.

As conventional sources of oil and gas decline, operators are increasingly turning their attention to unexplored or underdeveloped areas. Reservoirs with pressures and temperatures deemed higher than what was considered typical in the past are now frequent targets for exploration and development. These reservoirs and their associated wells are deemed high pressure/high temperature or HPHT.

According to the Society of Petroleum Engineers E&P glossary, high pressure/high temperature (HPHT) is where the undisturbed bottom hole temperature (at prospective reservoir depth or total depth) is greater than 300° F. or 150° C. and when the maximum anticipated pore pressure of the porous formation to be drilled exceeds a hydrostatic gradient of 0.8 psi/ft (18 kPa/m), or the well requiring pressure control equipment has a rated working pressure in excess of 10,000 psi or 69 MPa.

Such conditions require specialist knowledge and technology to safely exploit the reservoirs. Known pipe dope, such as API HP modified pipe dope, suitable for use in such conditions typically contains sulfur and heavy metals, such as lead, zinc and/or copper.

Chemicals, such as those used in pipe dope, for use in the offshore environment, are categorised according to a number of factors depending on local regulatory systems and requirements. Compositions containing such factors will then be categorised according to the chemicals contained therein. For example, the Oslo Paris (OSPAR) convention is the mechanism by which 15 governments of the western coasts and catchments of Europe cooperate to protect the marine environment of the North East Atlantic. OSPAR considers the use and discharge of hazardous substances in the offshore oil and gas industry as a cause for great concern. To reduce the overall impact of offshore chemicals on the marine environment, OSPAR has adopted a harmonised mandatory control system (HMCS) for use and reduction of discharges of offshore chemicals. This system promotes a shift towards the use of less hazardous or preferably non-hazardous substances in offshore oil and gas operations. To achieve these goals, the different OSPAR member states (principally, UK, Netherlands, Denmark and Norway) enforce slightly different schemes to classify the environmental hazards and risks associated with the use and discharge of chemicals offshore.

Under the UK/NL offshore chemical notification scheme (OCNS) managed by the Centre for Environment Fisheries and Aquaculture Science (CEFAS) in collaboration with NL state supervision of mines, products used offshore are assessed in one of two ways:
  i) a risk-based approach using the Chemical Hazard and Risk Management CHARM model (if applicable) which compares the predicted environmental concentration of a substance with its toxic effects on environmental organisms which results in a colour classification output (gold, silver, white, blue, orange, purple; ranked in order of low environmental risk to high environmental risk) or;
  ii) an assessment of the inherent environmental hazard and fate properties (toxicity, biodegradation and bioaccumulation potential) of a substance which results in letter category grouping from A to E (with A being most environmentally hazardous and E being least environmentally hazardous).

In Norway and Denmark, chemicals are categorised on the basis of their inherent environmental hazard properties (biodegradation, toxicity and bioaccumulation potential) using a colour classification system (green, yellow, red and black; with green chemicals considered to pose little or no risk (PLONOR) to the environment and black chemicals considered the most environmentally hazardous).

Heavy metals, such as lead, zinc and/or copper fall under the most harmful category (black or category A) and, therefore, use of such pipe dopes must be minimised and, preferably, avoided entirely through chemical substitution or "dope free" technologies. Furthermore, lead is on the OSPAR list of chemicals for priority action and is subject to monitoring activities to progress towards the cessation of its use and potential discharge to the marine environment.

In light of the desire to protect both human health and the environment, as well as increasing regulations in this area, much effort has been focussed on developing pipe dopes capable of long-term effective use in HPHT conditions which have a reduced health and environmental impact compared to known dopes.

For lower temperature applications, more environmentally-friendly alternatives (known as 'yellow' or 'OCNS category E-C' dope) are commercially available. However, OCNS category E-C rated pipe dopes typically stop working for temperatures over 150° C. The compounds tend to fail because of evaporation or thermal degradation of the base oil and/or the additives. As a consequence, lubricity is lost and the surface is damaged during the loading cycles leading to leakage. To date, despite all the research effort directed at this problem, no alternative dope to drill HPHT well materials and super duplex materials over 5000 PSI has been identified. Such a challenge is discussed in Inose K, Sugino M, Goto K. Influence of Grease on High-Pressure Gas Tightness by Metal-to-Metal Seals of Premium Threaded Connections, Tribol Online 2016; 11:227-34; and Nowinka J, Dall'Acqua D, New Standard for Evaluating Casing Connections for Thermal-Well Applications. SPE Drill Complet 2011; 26:419-31.

Thus, there is a global need for improved, more environmentally friendly lubricant compositions suitable for use as pipe dope with sufficient anti-galling and sealing performance for HPHT wells. Such formulations would be heavy metal free and, preferably, low sulfur.

SUMMARY OF THE INVENTION

Accordingly, the present invention provides a lubricant composition comprising:
(i) a base oil
(ii) an organophilic, clay-based thickener; and
(iii) a solid lubricant, wherein said solid lubricant does not comprise any heavy metals.

The present invention also provides the use of a lubricant composition comprising: a base oil; an organophilic clay-based thickener; and a solid lubricant, wherein said solid lubricant does not comprise any heavy metals, as a pipe dope.

The present invention also provides a high-pressure pipe thread joint comprising two mating threaded elements having disposed therebetween a high-pressure seal formed from said lubricant composition.

BRIEF DESCRIPTION OF THE DRAWINGS

FIGS. 1 to 3 show the results of the Examples contained herein.

DETAILED DESCRIPTION OF THE INVENTION

The present inventors have surprisingly found that a lubricant composition comprising: a base oil; an organophilic clay-based thickener; and a solid lubricant, which solid lubricant comprises no heavy metals, functions effectively as a pipe dope under high pressure and high temperature conditions. Said lubricant composition contains no heavy metals and can be low or free from sulfur, vastly decreasing the potential environmental impact of using such a pipe dope when drilling HPHT wells.

As used herein 'heavy metals' refers to the metals usually present in API HP modified pipe dope, particularly lead, zinc and/or copper, more particularly lead and/or copper. Preferably, the definition 'heavy metals' extends to metals that fall within periods 4 to 6 and groups 9 to 12 of the Periodic Table, as well as molybdenum, chromium, manganese, iron, indium, thallium, tin, lead, bismuth and polonium.

There are no particular limitations regarding the base oil composition used in the present invention, and various conventional mineral oils and synthetic oils may be conveniently used. The base oil composition used in the present invention may comprise mixtures of one or more mineral oils and/or one or more synthetic oils.

Mineral oils for use in the lubricant composition of the present invention include any of the Group I, Group II and Group III base oils. By "Group I" base oil, "Group II" base oil and "Group III" base oil are meant lubricating oil base oils according to the definitions of American Petroleum Institute (API) categories I, II and III. Such API categories are defined in API Publication 1509, 15th Edition, Appendix E, April 2002.

Particularly suitable mineral oils for use in the present invention include liquid petroleum oils and solvent-treated or acid-treated mineral lubricating oils of the paraffinic, naphthenic, or mixed paraffinic/naphthenic type which may be further refined by hydro finishing processes and/or dewaxing.

Other suitable mineral oils that may conveniently be used as the base oil or a component thereof in the lubricant composition of the present invention include Fischer-Tropsch process derived base oils, such as those disclosed for example in EP 0 776 959, EP 0 668 342, WO 97/21788, WO 00/15736, WO 00/14188, WO 00/14187, WO 00/14183, WO 00/14179, WO 00/08115, WO 99/41332, EP 1 029 029, WO 01/18156 and WO 01/57166. Such Fischer-Tropsch process derived base oils may be derived from any source, e.g. gas-to-liquids, coal-to-liquids, biomass-to-liquids.

Synthetic oils that may be used in the lubricant compositions of the present invention include Group IV base oils, especially hydrocarbon oils such as olefin oligomers (PAOs), and Group V base oils, such as dibasic acid esters, polyol esters, dewaxed waxy raffinate and polybutenes. Synthetic hydrocarbon base oils sold by the Shell Group under the designation "XHVI" (trade mark) may be conveniently used.

In a particularly preferred embodiment of the invention, the base oil is selected from those that are biodegradable in water-enriched environment to further enhance the favourable environmental performance characteristics of alternative heavy metal free HPHT pipe dopes. 'Biodegradable' as used herein refers to a substance in which the base grease of the compound degrades by at least 60% in 28 days in a standard OECD301B test (or OECD306 test). Examples of base oils known to be biodegradable in a water-enriched environment include esters, such as complex esters and polyol esters.

When a biodegradable base oil, particularly an ester base oil, is used in the lubricant composition of the present invention, it is preferable that it is used in combination with a minor amount of a further solubilising oil preferably mineral oil, polyalphaolefin (PAO) or hexadecane. The minor amount of the further solubilising oil is preferably an amount in the range of from 2 to 20 wt %, more preferably from 5 to 15 wt %, based on the overall lubricant composition.

This minor amount of the further solubilising oil, in combination with the ester base oil, improves sealing performance when the lubricant composition is used as a pipe dope in a high pressure pipe thread joint.

The total amount of base oil incorporated in the lubricant composition of the present invention is preferably in the range of from 30 to 95 wt %, more preferably in an amount in the range of from 45 to 90 wt % and most preferably in an amount in the range of from 45 to 70 wt %, with respect to the total weight of the lubricant composition. All percentages herein defined are expressed with reference to the total weight of the lubricant composition.

The viscosity of the base oil is preferably in the range of from 22 to 1500 $mm^2s^{-1}$ (cSt) at 40° C. More preferably, it can be in the range of from 100 to 1000 $mm^2s^{-1}$ (cSt) at 40° C. and most preferably in the range of from 320 to 1000 $mm^2s^{-1}$ (cSt) at 40° C.

The organophilic clay-based thickener is suitably selected from clays modified by treatment with surface-active agents. Said clays are preferably montmorillonites and most preferably the organophilic clay-based thickener is a bentonite-based thickener.

The thickener is preferably surface treated, so it is dispersible in hydrocarbon or alternative base fluids. This treatment can be done with quaternary ammonium compounds with aliphatic hydrocarbon chains in the range from $C_{10}$ to $C_{24}$, particularly in the range $C_{12}$ to $C_{18}$.

The thickener is suitably also activated during manufacture of the lubricant. Water, methanol, ethanol, acetone, propylene carbonate, or mixtures of two or more of these, can be used as activators to break down the adhesion between the layers of the thickener particles allowing then to divide under shear, increasing the thickener surface area and its thickening efficiency.

The organophilic, clay-based thickener is preferably present in an amount of at least 5 wt %, more preferably at least 7 wt % based on the overall weight of the lubricant composition. The organophilic, clay-based thickener is preferably present in an amount of at most 20 wt %, more preferably at most 15 wt % based on the overall weight of the lubricant composition.

The concentration of the activator can be in the range 0.1 to 5 wt % based on the overall weight of the lubricant composition. In particular an activator concentration in the range 0.5 to 2 wt % can be used.

The solid lubricant does not comprise any heavy metals and is preferably chosen from the group of inorganic compounds which are crystalline at room temperature and have crystal structures which allow slippage when sheared strongly. Preferred solid lubricants, which do not comprise any heavy metals, include graphite, specifically natural or synthetic graphite. Preferably, the solid lubricant, which does not contain any heavy metals, used in the lubricant composition comprises natural or synthetic graphite. Most preferably, the solid lubricant, which does not contain any heavy metals, is natural or synthetic graphite.

For such solid lubricants to be usable for this application it is preferred that they be finely powdered with an average particle size in the range 0.1 to 100 microns.

Preferably, the solid lubricant is present in an amount in the range of from 5 to 30 wt % base on the overall weight of the lubricant composition.

In a preferred embodiment, the lubricant composition also comprises one or more group 2 metal based inorganic compounds.

For the one or more group 2 metal based inorganic compounds, the group 2 metal is preferably selected from calcium and magnesium. Most preferably, the group 2 metal is calcium.

Preferably the one or more group 2 metal based inorganic compounds is selected from the group consisting of one or more of calcium carbonate, calcium sulfate, calcium hydroxide, calcium oxide and calcium phosphate. Most preferably, the one or more group 2 based mineral inorganic compounds is calcium phosphate.

Preferably, the one or more group 2 metal based inorganic compounds is finely powdered with an average particle size in the range of from 0.1 to 100 microns.

If present, the one or more group 2 metal based inorganic compounds is present in an amount in the range of from from 4 to 20 wt % on the basis of the total weight of the lubricant composition.

Optionally, regardless of whether or not the lubricant composition comprises a group 2 based mineral inorganic compound, the lubricant composition may comprise a melamine-based powdered flame retardant.

The melamine-based powdered flame retardant may be based on melamine alone or as a complex with an acid. Suitable acids include cyanuric acid, phosphoric acids to form, for example, melamine phosphate, pyrophosphate or polyphosphate, and boric acid, to form melamine borate. Mixture of melamine-acid complexes may also be used. A particularly preferred melamine-based powdered flame retardant is melamine cyanurate.

Melamine cyanurate is also known as melamine-cyanuric acid adduct or melamine-cyanuric acid complex and is a crystalline complex formed from a 1:1 mixture of melamine and cyanuric acid.

If present, the melamine-based powdered flame retardant is suitably present in an amount of from 4 to 15 wt % on the basis of the total weight of the lubricant composition.

Also optionally, and possibly in addition to any melamine-based powdered flame retardant and/or group 2 metal-based inorganic compound, the lubricant composition may comprise one or more polymers selected from those solid at room temperature and pressure.

If present, the one or more polymers suitable for use in the lubricant composition are selected from those solid at room temperature and pressure. Preferred polymers are those selected from the group consisting of polyalkenes (simple or copolymers), polyamides, polystyrene, polycarbonate and polyoxymethylene. More preferably the one or more polymers are selected from one or more polyamides.

A polyamide is a polymeric reaction product of a diamine and a dicarboxylic acid. Preferred polyamides are aliphatic polyamides. More preferably, the carbon chain lengths of the diamine and dicarboxylic acid used to form the polyamide may be chosen from those in the range of from $C_2$ to $C_{12}$. The overall final molecular weight of the polyamide is preferably in the range of from 20000 to 50000. Copolymers, in which more than one diamide or diacid are used are also possible.

Without wishing to be bound by theory, it is believed that suitable polymers are ones that deform but do not melt at the temperatures and pressures present in HPHT wells.

If present, the polymers used in the lubricant composition are preferably finely powdered with an average particle size in the range of from 0.1 to 100 microns.

If present, the one or more polymers suitable for use in the lubricant composition are suitably present in an amount of from 4 to 15 wt % on the basis of the total weight of the lubricant composition.

The present invention is further described below by reference to the following examples, which are not intended to limit the scope of the present invention in any way.

EXAMPLES

Pipe dopes according to the following formulations were tested. All % given in the Examples are wt % based on the overall weight of the lubricant composition.

Example 1

Comparative

Existing Black or OCNS Category A Dope
(API-Modified)

| | |
|---|---|
| Aluminium complex soap | 6% |
| ISO VG100 paraffinic base oil (SN500) | 31% |
| Lead powder | 30% |
| Graphite powder | 18% |
| Zinc powder | 12% |
| Copper powder | 3% |

This is an existing high pressure/high temperature pipe dope. It is classified as OCNS category A and has a substitution warning in accordance with the UK OCNS (as per CEFAS Definitive Ranked Lists of Registered Products) and is classified 'black' for potential applications offshore Norway.

Example 2A

Comparative

Example 2A used Jet-Lube HPHT pipe dope, a commercially available OCNS category E yellow pipe dope. According to MSDS and other available information, this dope comprises:

| | |
|---|---|
| Calcium fluoride | 25-35% |
| Calcium sulfate | 5-10% |
| Graphite | 1-3% |
| Calcium carbonate | 1-3% |
| Base oil (synthetic PAO/ester) | remainder |

Example 2B

Comparative

Example 2B used Best-o-life 4010 NM pipe dope, a commercially available OCNS category E/yellow pipe dope. According to MSDS and other available information, this dope comprises:

| | |
|---|---|
| Light naphthenic base oil | 30-50% |
| Graphite | 10-20% |
| Talc | 5-10% |
| Calcium carbonate | 5-10% |
| Calcium acetate | 5-10% |
| Calcium fluoride | 5-10% |
| Dolomite | 1-5% |
| Titanium dioxide | 1-5% |
| Calcium oxide | 1-5% |
| Quartz | 0.1-1% |

Example 2C

Comparative

Example 2C used SOCO Envirol pipe dope, a commercially available OCNS category E/yellow pipe dope. According to MSDS and other available information, this dope comprises:

Synthetic ester

Mineral fillers

The dopes used in Examples 2A, 2B and 2C are existing commercial dopes that have been registered and classified as OCNS category E/yellow in accordance with the UK and Norwegian OSPAR schemes, respectively.

The following (inventive) examples were also formulated, with the compositions as set out below. Graphite powder is an example of a solid lubricant, which does not comprise any heavy metals. Polyamide 10 micron is an example of a polymer solid at room temperature. Calcium phosphate powder is an example of a group 2 metal based inorganic compound. Treated bentonite is an organophilic, clay-based thickener.

Example 3A

Inventive

| | |
|---|---|
| Treated bentonite | 10% |
| ISO VG460 mineral base oil | 60% |
| Graphite powder | 15% |
| Powdered melamine cyanurate | 15% |

Example 3B

Inventive

| | |
|---|---|
| Treated bentonite | 10% |
| ISO VG460 mineral base oil | 60% |
| Calcium phosphate powder | 10% |
| Graphite powder | 10% |
| Powdered melamine cyanurate | 10% |

Example 3C

Inventive

| | |
|---|---|
| Treated bentonite | 10% |
| ISO VG460 mineral base oil | 60% |
| Calcium phosphate powder | 15% |
| Graphite powder | 15% |

Example 3D

Inventive

| | |
|---|---|
| Treated bentonite | 10% |
| ISO VG460 mineral base oil | 60% |
| Calcium phosphate powder | 10% |
| Graphite powder | 10% |
| Polyamide 10 micron | 10% |

Example 3E

Inventive

| | |
|---|---|
| Treated bentonite | 10% |
| ISO VG460 mineral base oil | 60% |
| Calcium phosphate powder | 10% |
| Graphite powder | 10% |
| Polyamide 5 micron | 10% |

Example 3F

Inventive

| Treated bentonite | 10% |
| --- | --- |
| Ester base oil (e.g. Radialube 7257) | 50% |
| Graphite | 15% |
| Mineral oil | 15% |
| Calcium phosphate | 10% |

The dopes were tested in a range of industry-recognised tests. The rationale behind the tests used is that loss of lubricity through evaporation of the base oil and the lack of tribofilm formation results in surface damage and subsequently leakage of the metal-to-metal seals.

A) The evaporation tendency was tested by thermogravimetric analysis (TGA). The protocol entails a temperature sweep from ambient temperature (25° C.) to 250° C., at a temperature increase rate of 1° C./minute, followed by a waiting period of 30 minutes at 250° C. At the end of the waiting time, another temperature sweep from 250° C. back to room temperature was performed.

The relative weight loss results of the TGA are shown in FIG. 1. A wide variety in weight loss can be observed. The weight loss is predominantly because of evaporation of the base oil. Next to that, phase transitions and/or oxidation were observed using Differential Scanning Calorimetry (DSC). In general, all OCNS category E-C dopes (assigned classification based on preliminary screening of available environmental performance data) show early onset of evaporation because of the relative light oils that are used compared to API modified. It is clear that the Examples of the invention show the lowest evaporation loss.

The pin-on-disc test is designed to investigate make-up sliding parallel to the machining direction. Next to that, the relatively small stroke length gives insight in the lubricant behaviour during micro sliding. The applied contact stresses are equivalent to those in the metal-to-metal seal of a premium connection. The tests are carried out using an R=5 mm steel (AISI52100) ball against a quenched and tempered steel (AISI4130) disc. The ball is polished and has a surface roughness of $S_a$=0.01 μm and a surface hardness of 700 HV. The disc is produced by polishing and has a surface roughness of $S_a$=0.01 μm and a surface hardness of 320 HV.

The pin-on-disc tests are performed at a maximum Hertzian contact stress of 1 GPa by applying 10 N normal load. The contact spot diameter is approximately 140 μm at this stress. The imposed reciprocating sliding length is 500 μm at a frequency of 0.5 Hz. With 1500 cycles the equivalent sliding length is 1500 mm. Every 250 cycles the cycling was stopped, the ball lifted slightly from the surface after which the temperature was increased stepwise. Once at the new temperature set point, the test continued for another 250 cycles. The temperature sequence was repeated for the steps 30-70-100-150-200-250° C. Prior to each experiment the lubricant is applied once with a cotton swab on the disc and pin surface.

The inventive dopes (3A, 3B, 3C, 3D, 3E and 3F) were compared with comparative examples 1, 2A, 2B and 2C. The results of the high temperature tribological stability tests are shown in FIG. 2. In FIG. 2, the bars indicate the mean coefficient of friction (CoF), error bars indicate 1 sigma variation (designated as StDev) in CoF during the test and the dots indicate the maximum observed CoF (designated as $CoF_{max}$). A low and stable CoF correlated directly with low or no surface damage and overall good performance. It is clear that the inventive dopes display more stable friction behavior compared to the comparative OCNS category E/Yellow dopes (Examples 2A, 2B and 2C). The inventive dopes also show lower and more stable CoFs compared with HPHT dope (Example 1).

It is postulated, without wishing to be bound by theory, that the success of the dopes of the present invention may be attributable to strong film forming. The film will protect the connection metal-to-metal seal surface long after the lubricant has lost its base oil. This does not happen for the other (comparative) OCNS category E dopes in the comparison and is in line with the results from Example 1.

Finally, the strip test was used for contact stresses and sliding velocities equivalent to those in the connection metal-to-metal seal. The strip tests were done using a steel (P110) anvil against a steel (P110) strip. The anvil was turned and had a surface roughness of $S_a$=1.6 μm and a surface hardness of 320 HV. The strip had a lay applied by planing with a cutting element in sliding direction and had a surface roughness of $S_a$=1.6 μm and a surface hardness of 320 HV. These surface properties are common for casing connections.

The tests were performed at a maximum Hertzian contact stress of 1.4 GPa by applying 20 kN normal load. A linear load ramp was applied over the first 5 strokes. The contact spot was elliptic and approximately 5.7 mm×1.1 mm. The sliding velocity was 25 mm/s. Up to 50 strokes were made with a sliding length of 31 mm.

The results are shown in FIG. 3. In FIG. 3, summary statistics cover 50 strokes. The bars indicate the mean coefficient of friction (CoF), error bars indicate 1 sigma variation (designated as StDev) in CoF during the test and the dots indicate the maximum observed CoF (designated as $CoF_{max}$). Galling was observed for both Example 1 and 2C. For Example 3B no galling was observed. Compared to Example 2C, the inventive Example 3B demonstrated superior performance on as machined vs as machined P110 rubbing against each other under make-up conditions. Similar performance is exhibited compared to Comparative Example 1.

The inventive Examples show excellent lubrication characteristics and good thermal stability, even under HPHT conditions, without the presence of the heavy metals previously required for pipe dopes for this use. It is believed, without wishing to be bound by theory, that even when the base oil present in the formulations evaporates off, the remaining components form a film with good sliding performance.

That which is claimed is:
1. A lubricant composition comprising:
(i) a base oil
(ii) in the range of from 5 wt % to 15 wt % of an organophilic clay-based thickener; and
(iii) a solid lubricant, wherein said solid lubricant does not comprise any lead, and wherein the solid lubricant is selected from natural and synthetic graphite, and wherein the lubricant composition also comprises in the range of from 4 to 20 wt % of one or more group 2 metal based inorganic compounds selected from the group consisting of one or more of calcium carbonate, calcium sulfate, calcium hydroxide, calcium oxide and calcium phosphate,
wherein the solid lubricant is present in an amount of 5 to 30 wt % based on the overall weight of the lubricant composition, wherein the organophilic clay-based thickener is a bentonite-based thickener and the bentonite-based thickener is surface treated with quaternary ammonium compounds with aliphatic hydrocarbon chains in the range from $C_{10}$ to $C_{24}$, and wherein the lubricant composition is applied as a pipe dope.

2. The lubricant composition as claimed in claim 1, wherein the one or more group 2 metal based inorganic compounds comprises calcium phosphate.

3. The lubricant composition as claimed in claim 1, wherein the lubricant composition also comprises a melamine-based powdered flame retardant.

4. The lubricant composition as claimed in claim 1, wherein the lubricant composition also comprises one or more polymers selected from those solid at room temperature and pressure.

5. The lubricant composition as claimed in claim 1, wherein the base oil is selected from those biodegradable in a water rich environment.

6. The lubricant composition as claimed in claim 5, wherein the base oil also contains in the range of from 2 to 20 wt % on the basis of the whole lubricant composition of a mineral oil.

7. The lubricant composition as claimed in claim 1, wherein the lubricant composition is applied to a high pressure pipe thread joint comprising two mating threaded elements having disposed therebetween a high-pressure seal formed from the lubricant composition.

* * * * *